United States Patent
Sadineni et al.

(10) Patent No.: US 11,277,084 B2
(45) Date of Patent: Mar. 15, 2022

(54) DRIVER FOR HAPTICS AND CAMERA VOICE COIL MOTOR APPLICATIONS

(71) Applicant: QUALCOMM Incorporated, San Diego, CA (US)

(72) Inventors: Venkatesh Sadineni, Hyderabad (IN); Rahul Soni, Hyderabad (IN); Mohammad Wasim Sayed, West Bengal (IN)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/928,650

(22) Filed: Jul. 14, 2020

(65) Prior Publication Data
US 2022/0021319 A1  Jan. 20, 2022

(51) Int. Cl.
*H02P 7/025* (2016.01)
*B06B 1/02* (2006.01)

(52) U.S. Cl.
CPC ............ *H02P 7/025* (2016.02); *B06B 1/0207* (2013.01)

(58) Field of Classification Search
CPC .... H02P 7/00; H02P 7/02; H02P 7/025; H02P 7/03; H02P 7/04; H02P 7/06; H02P 7/14; H02P 7/29; H02P 1/00; H02P 1/04; H02P 1/16; H02P 1/18; H02P 1/46
See application file for complete search history.

(56) References Cited

U.S. PATENT DOCUMENTS

| | | | | |
|---|---|---|---|---|
| 5,907,487 A | * | 5/1999 | Rosenberg | G06F 1/266 700/85 |
| 5,999,168 A | * | 12/1999 | Rosenberg | A63F 13/06 345/161 |
| 7,446,752 B2 | * | 11/2008 | Goldenberg | A63F 13/06 345/156 |
| 8,040,224 B2 | * | 10/2011 | Hwang | H04M 19/04 340/407.2 |
| 9,134,795 B2 | * | 9/2015 | Braun | G06F 3/016 |
| 9,959,716 B2 | * | 5/2018 | Macours | H02P 25/034 |
| 10,116,196 B2 | * | 10/2018 | Kim | H02K 41/0356 |
| 10,128,880 B2 | * | 11/2018 | Roy | H04B 1/16 |
| 10,416,770 B2 | * | 9/2019 | Lacroix | A63F 13/23 |
| 2015/0115848 A1 | * | 4/2015 | McFadden | G06F 3/0362 318/135 |

* cited by examiner

*Primary Examiner* — Antony M Paul
(74) *Attorney, Agent, or Firm* — Qualcomm Incorporated

(57) ABSTRACT

Methods, systems, and devices for an H-bridge driver for haptics and camera voice coil motor applications are described. A device may generate a control signal for an application executing on the device such as a camera application, a gaming application, or any application receiving a user input or outputting feedback to the user. The device may generate the control signal using a voice coil motor driver of a camera component of the device. The device may drive a haptics motor based on the generated control signal and generate a haptic response based on driving the haptics motor. The device may, as a result, output the generated haptic response. Additionally or alternatively, the device may drive a voice coil motor based on the generated control signal and may control a camera component of the device based on driving the voice coil motor or the haptics motor, or both.

18 Claims, 10 Drawing Sheets

DRIVER FOR HAPTICS AND CAMERA VOICE COIL MOTOR APPLICATIONS

BACKGROUND

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include entertainment systems, information systems, virtual reality systems, model and simulation systems, and so on. These systems may employ a combination of hardware and software technologies to support processing, storage, generation, manipulation and rendition of multimedia information, for example, such as client devices, capture devices, storage devices, communication networks, computer systems, and display devices. In some cases, these devices may be configured with a haptic motor to provide haptic feedback to a user, for example, alerts, notifications, or user feedback when using an application. The devices may also be configured with additional haptic motors to improve user experience. However, such configurations may demand extra hardware resources for utilizing the additional haptic motors. The devices may, in some cases, include a pulse-width modulation half-bridge driver for driving the haptic motor. As demand for improving user experience continues to increase, it may be desirable to provide improvements to haptic feedback without increasing device footprint (e.g., hardware components).

SUMMARY

The present disclosure relates to improved methods, systems, devices, and apparatuses that support an H-bridge driver for haptics and camera voice coil motor applications. Various aspects of the present disclosure relate to configuring a device with a voice coil motor driver for driving a camera module of the device. The device may be configured to use the voice coil motor driver to generate a pulse-width modulation signal for driving a haptic motor of the device. In some examples, the device may be configured to use the voice coil motor driver to drive the haptic motor with minimal circuitry additions. For example, the device may be configured to drive the haptic motor using the voice coil motor driver instead of a separate haptics driver to reduce a resource overhead of the device (e.g., device footprint, power consumption).

A method of haptic feedback at a device is described. The method may include generating a control signal for an application executing on the device using a voice coil motor driver of the device, driving a haptics motor of the device based on the generated control signal, generating a haptic response based on driving the haptics motor of the device, and outputting the generated haptic response from the device.

An apparatus for haptic feedback is described. The apparatus may include a processor, memory coupled with the processor, and instructions stored in the memory. The instructions may be executable by the processor to cause the apparatus to generate a control signal for an application executing on the apparatus using a voice coil motor driver of the apparatus, drive a haptics motor of the apparatus based on the generated control signal, generate a haptic response based on driving the haptics motor of the apparatus, and output the generated haptic response from the apparatus.

Another apparatus for haptic feedback is described. The apparatus may include means for generating a control signal for an application executing on the apparatus using a voice coil motor driver of the apparatus, driving a haptics motor of the apparatus based on the generated control signal, generating a haptic response based on driving the haptics motor of the apparatus, and outputting the generated haptic response from the apparatus.

A non-transitory computer-readable medium storing code for haptic feedback at a device is described. The code may include instructions executable by a processor to generate a control signal for an application executing on the device using a voice coil motor driver of the device, drive a haptics motor of the device based on the generated control signal, generate a haptic response based on driving the haptics motor of the device, and output the generated haptic response from the device.

Some examples of the method, apparatuses, and non-transitory computer-readable medium described herein may further include operations, features, means, or instructions for driving a voice coil motor of the device based on the generated control signal, and controlling a camera component of the device based on driving the voice coil motor or the haptics motor, or both.

In some examples of the method, apparatuses, and non-transitory computer-readable medium described herein, the camera component of the device includes the voice coil motor.

In some examples of the method, apparatuses, and non-transitory computer-readable medium described herein, generating the control signal may include operations, features, means, or instructions for generating a pulse-width modulation signal, and determining a duty cycle of the generated pulse-width modulation signal, where driving the haptics motor, or the voice coil motor, or both, includes.

In some examples of the method, apparatuses, and non-transitory computer-readable medium described herein, a camera component of the device includes the voice coil motor.

In some examples of the method, apparatuses, and non-transitory computer-readable medium described herein, the voice coil motor driver includes an H-bridge configuration.

Some examples of the method, apparatuses, and non-transitory computer-readable medium described herein may further include operations, features, means, or instructions for enabling at least one gate driver associated with the voice coil motor driver, and selecting a full-bridge configuration or a half-bridge configuration of the H-bridge configuration based on enabling the at least one gate driver, where driving the haptics motor, or the voice coil motor, or both, includes.

Some examples of the method, apparatuses, and non-transitory computer-readable medium described herein may further include operations, features, means, or instructions for selecting between the haptics motor or the voice coil motor using an analog demultiplexer based on the control signal, where driving the haptics motor, or the voice coil motor, or both, includes.

Some examples of the method, apparatuses, and non-transitory computer-readable medium described herein may further include operations, features, means, or instructions for driving a second haptics motor of the device based on the generated control signal, where generating the haptic response includes.

Some examples of the method, apparatuses, and non-transitory computer-readable medium described herein may further include operations, features, means, or instructions for generating a second control signal using a second voice coil motor driver of the device, and driving the haptics motor, a voice coil motor of the device, a second haptics motor of the device, or a second voice coil motor of the device, or any combination thereof, based on the generated second control signal.

In some examples of the method, apparatuses, and non-transitory computer-readable medium described herein, generating the haptic response may include operations, features, means, or instructions for generating the haptic response based on driving the second haptics motor of the device.

DETAILED DESCRIPTION

Figure 1:
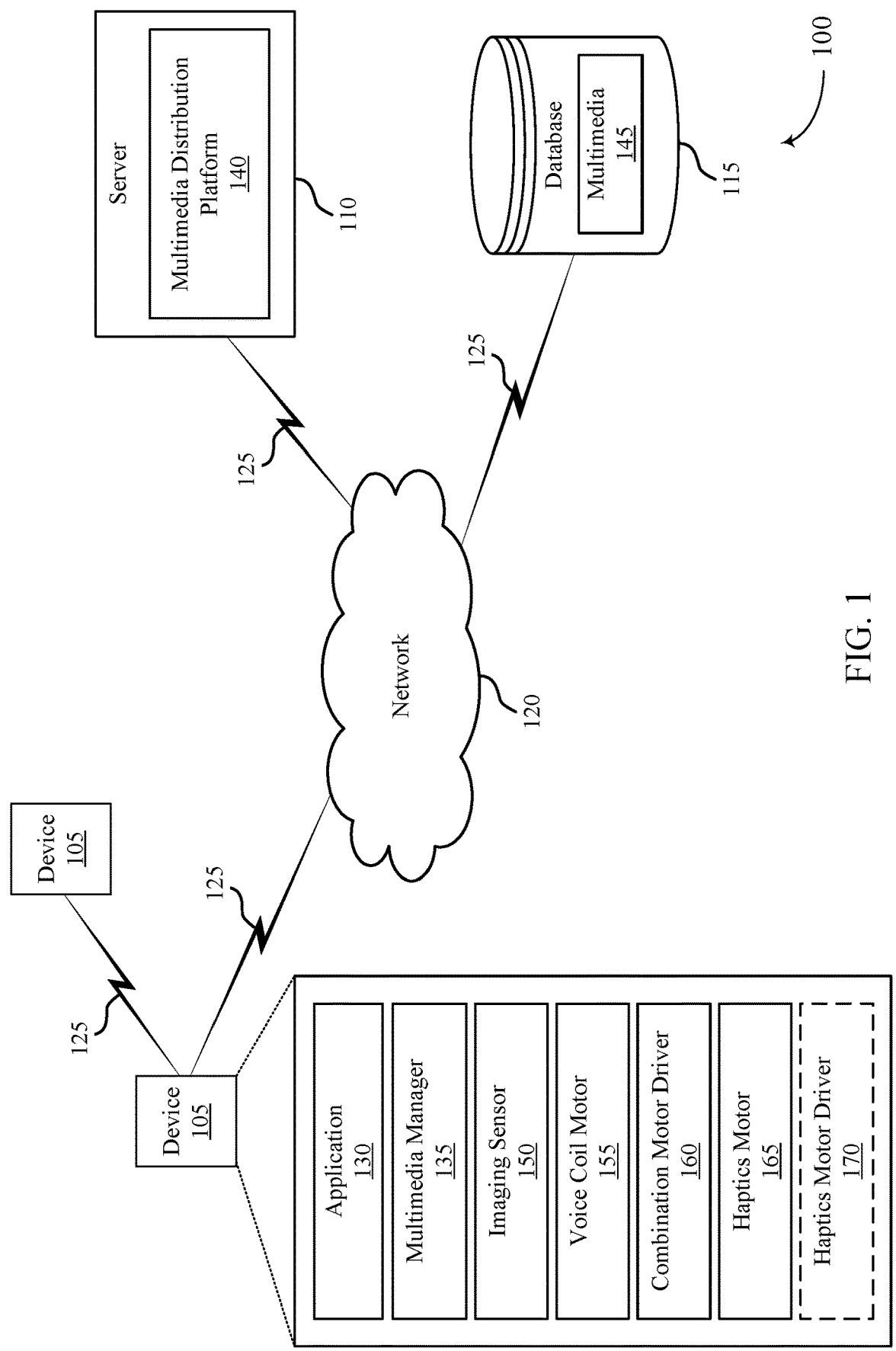
FIG. 1 illustrates an example of a multimedia system that supports an H-bridge driver for haptics and camera voice coil motor applications in accordance with aspects of the present disclosure.

Various aspects of the present disclosure relate to configuring a device with an H-bridge driver for haptics and camera voice coil motor applications. In some cases, the device may be configured with an auto focus driver integrated circuitry, such as a voice coil motor driver. The device may be configured to use the voice coil motor driver to generate a pulse-width modulation signal for driving a camera component of the device and a haptic motor of the device, which may reduce an amount of circuitry for driving both the camera module and the haptic motor. For example, the device may be configured to drive the haptic motor using the voice coil motor driver instead of a separate haptics driver, which may decrease a resource overhead of the device (e.g., device footprint).

The device may generate a control signal for an application executing on the device, for example, a camera application, a gaming application, or any application receiving a user input or outputting feedback (e.g., a user notification, a haptic response) to the user. The device may generate the control signal using the voice coil motor driver of the camera component of the device. In some examples, the device may drive the haptics motor of the device based on the generated control signal and generate a haptic response based on driving the haptics motor. The device may output the generated haptic response. In some other examples, the device may drive the voice coil motor of the device based on the generated control signal. For example, the device may control the camera component of the device based on driving the voice coil motor or the haptics motor, or both. In an example of generating the control signal, the device may generate a pulse-width modulation signal. The device may determine a duty cycle of the generated pulse-width modulation signal, and in some examples, drive the haptics motor, or the voice coil motor, or both, based on the determined duty cycle of the generated pulse-width modulation signal.

Aspects of the present disclosure may be implemented to realize one or more of the following potential improvements, among others. The techniques employed by the device may provide benefits and enhancements to the operation of the device. For example, operations performed by the device may provide improvements to haptic operations (e.g., haptic feedback). In some examples, configuring the device to use a voice coil motor driver to drive a haptic motor may promote low latency haptic operations. In some other examples, configuring the device to drive the haptic motor using the voice coil motor driver instead of a separate haptics driver may provide improvements to power consumption and, in some examples, may decrease a resource overhead of the device (e.g., device footprint), among other benefits.

Aspects of the disclosure are initially described in the context of a multimedia system. Aspects of the disclosure are further illustrated by and described with reference to apparatus diagrams, system diagrams, and flowcharts that relate to techniques for using an H-bridge driver for haptics and camera voice coil motor applications.

FIG. 1 illustrates an example multimedia system 100 that supports an H-bridge driver for haptics and camera voice coil motor applications in accordance with aspects of the present disclosure. The multimedia system 100 may include devices 105, a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. In some cases, the devices 105, the server 110, and the database 115 may communicate with each other and exchange information that supports techniques for using an H-bridge driver for haptics and camera voice coil motor applications, such as multimedia packets, multimedia data, or multimedia control information, via network 120 using communications links 125. In some examples, a portion or all of the techniques described herein supporting techniques for using an H-bridge driver for haptics and camera voice coil motor applications may be performed by the devices 105, or the server 110, or both.

A device 105 may be a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some examples, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130, a multimedia manager 135, an imaging sensor 150, a voice coil motor 155, a combination motor driver 160 (also referred to as a voice coil motor driver or a voice coil motor/haptics driver), a haptics motor 165, and a haptics motor driver 170. While, the multimedia system 100 illustrates the devices 105 including both the application 130 and the multimedia manager 135, the application 130 and the multimedia manager 135 may be an optional feature for the devices 105. In some examples, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125. In some examples, the application 130 may be a multimedia-based application (e.g., a camera application) associated with the imaging sensor 150. In some other examples, the application 130 may be a gaming application, a messaging application, or any application receiving a user input or outputting feedback (e.g., a user notification, a haptic response) to the user.

The imaging sensor 150 may be capable of capturing individual image frames (such as still images) and/or capturing video (such as a succession of captured image frames). In some examples, the imaging sensor 150 may include one or more image sensors (not shown for simplicity), pixel arrays, and shutters for capturing an image frame and providing the captured image frame to a controller of the device 105. The imaging sensor 150 may be referred to as a camera component.

The voice coil motor 155 may include an electric motor including a magnetic housing, a yoke, and a motor coil. In some cases, the voice coil motor 155 may move based on a voltage applied by the combination motor driver 160 across a set of terminals of the voice coil motor 155. The voice coil motor 155 may move in different directions based on the polarity of the applied voltage. In some cases, force generated by the movement of the voice coil motor 155 may be proportional to the amount of current flowing through the motor coil. The voice coil motor 155 may be referred to as a voice coil actuator.

The combination motor driver 160 may include an H-bridge configuration. In some examples, the device 105 may select a full-bridge configuration or from a set of half-bridge configurations of the H-bridge configuration of the combination motor driver 160. In an example aspect, the device 105 may enable a gate driver (or set of gate drivers) associated with the combination motor driver 160 to select the full-bridge configuration. In another example aspect, the device 105 may enable a gate driver (or set of gate drivers) associated with the combination motor driver 160 to select one of the half-bridge configurations. The device 105 (e.g., via the combination motor driver 160) may drive the voice coil motor 155, the haptics motor 165, or both, based on the full-bridge configuration or the half-bridge configuration.

For example, the device 105 (e.g., via the combination motor driver 160) may drive the voice coil motor 155 using a half-bridge configuration. In some examples, the device 105 may use drive the voice coil motor 155 using a half-bridge configuration in combination with feedback topology, which may provide precision current flow for moving a camera lens or lens barrel in forward (e.g., zoom-in) or backward (e.g., zoom-out) directions. In another example, the device 105 (e.g., via the combination motor driver 160) may drive the haptics motor 165 using the full-bridge configuration. For example, the device 105 may use the full-bridge configuration to provide for haptics motor movement in a clockwise direction or a counter-clockwise direction (e.g., for braking mechanism) in association with haptics applications.

In some examples, the voice coil motor 155 and the combination motor driver 160 may be electrically coupled with the imaging sensor 150. The voice coil motor 155, the combination motor driver 160, or both may be integrated with the imaging sensor 150. In some other examples, the voice coil motor 155, the combination motor driver 160, or both may be separate from the imaging sensor 150. In some examples, the device 105 (e.g., via the combination motor driver 160) may drive multiple voice coil motors 155, multiple haptics motors 165, or any combination thereof.

The haptics motor 165 may be a haptics actuator. The haptics motor 165 may move based on a voltage applied across a set of terminals of the haptics motor 165. For example, the haptics motor 165 may produce vibrations by rotating or moving a mass based on the applied voltage. In some cases, the vibrations of the haptics motor 165 may be proportional to the applied voltage. In some examples, the haptics motor 165 may be an eccentric rotating mass (ERM) motor or a linear resonant actuator (LRA). In some examples, the haptics motor 165 may be driven by the combination motor driver 160. In some other examples, the haptics motor 165 may be driven by the haptics motor driver 170.

The haptics motor driver 170 may include an H-bridge configuration, for example, for maintaining a high level of efficiency. In some examples, the device 105 may utilize a full-bridge configuration of the H-bridge configuration of the haptics motor driver 170. In an example, the device 105 (e.g., using the H-bridge configuration of the haptics motor driver 170) may provide an output current for the haptics motor 165 to rotate or resonate a load (e.g., resistor-inductor load) of the haptics motor 165 forward or backward.

The device 105 may include any number of imaging sensors 150, voice coil motors 155, voice coil motor drivers 160, haptics motors 165, and haptics motor drivers 170. For example, the device 105 may include a first combination motor driver 160 driving a first voice coil motor 155 and a first haptics motor 165, and a haptics motor driver 170 driving a second haptics motor 165. In another example, the device 105 may include a first combination motor driver 160 driving a first voice coil motor 155 and a first haptics motor 165, and a second combination motor driver 160 driving a second voice coil motor 155 and a second haptics motor 165.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform operations for enabling raw data processing, controlling haptics, enabling camera features, and managing the voice coil motor 155 (e.g., in association with a camera subsystem of the device 105, such as the imaging sensor 150). In some examples, the multimedia manager 135 may perform operations associated with a user interface (e.g., enabling haptics and haptics audio features, controlling vibration strength, selecting or implementing a haptics pattern), haptics management (e.g., power management IC (PMIC) for haptics, codecs for haptics, selecting haptics effects, haptics effects management), a touch interface of the device 105 (e.g., providing information to haptics), and audio associated with applications on the device 105 (e.g., performing audio to haptics conversion). By further example, the multimedia manager 135 may process multimedia data to support techniques for using an H-bridge driver for haptics and camera voice coil motor applications, according to the techniques described herein.

The server 110 may be a data server, a cloud server, a server associated with a multimedia subscription provider, proxy server, web server, application server, communications server, home server, mobile server, or any combination thereof. The server 110 may in some examples include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device 105 may support techniques for using an H-bridge driver for haptics and camera voice coil motor applications associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The wireless links (e.g., communication links 125) may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

Improved techniques for using an H-bridge driver for haptics and camera voice coil motor applications are described. A device 105 may generate a control signal for an application 130 executing on the device 105 such as a camera application, a gaming application, or any application receiving a user input or outputting feedback (e.g., a user notification, a haptic response) to the user. The device 105 may generate the control signal using a combination motor driver 160 of a camera component (e.g., imaging sensor 150) of the device 105. In some examples, the device 105 may drive a haptics motor 165 of the device 105 based on the generated control signal and generate a haptic response based on driving the haptics motor 165. The device 105 may output the generated haptic response.

In some other examples, the device 105 (e.g., using the combination motor driver 160) may drive a voice coil motor 155 of the device 105 based on the generated control signal. For example, the device 105 may control a camera component (e.g., imaging sensor 150) of the device 105 based on driving the voice coil motor 155 or the haptics motor 165, or both. In an example of generating the control signal, the device 105 may generate a pulse-width modulation signal. The device 105 may determine a duty cycle of the generated pulse-width modulation signal. In some examples, the device 105 may drive the voice coil motor 155 based on the determined duty cycle of the generated pulse-width modulation signal. In some other examples, the device 105 may drive the haptics motor 165 based on the determined duty cycle of the generated pulse-width modulation signal.

The techniques described herein may provide improvements in using an H-bridge driver for haptics and camera voice coil motor applications. Furthermore, the techniques described herein may provide benefits and enhancements to the operation of the devices 105. For example, by driving the haptics motor 165 of the device 105 using a control signal generated by the combination motor driver 160, the amount of haptics circuitry (e.g., haptics intellectual property) may be reduced, thus reducing hardware cost. In some examples, driving both the voice coil motor 155 and the haptics motor 165 using the same driver (e.g., combination motor driver 160) may reduce device footprint and device size, which may provide additional space for larger displays or additional haptics motors 165 within the device 105. In some examples, by driving the voice coil motor 155 using half-bridge configurations of the H-bridge configuration of the combination motor driver 160, backward spring drive associated with voice coil motor applications (e.g., associated with driving the voice coil motor 155) may be omitted.

Figure 2:
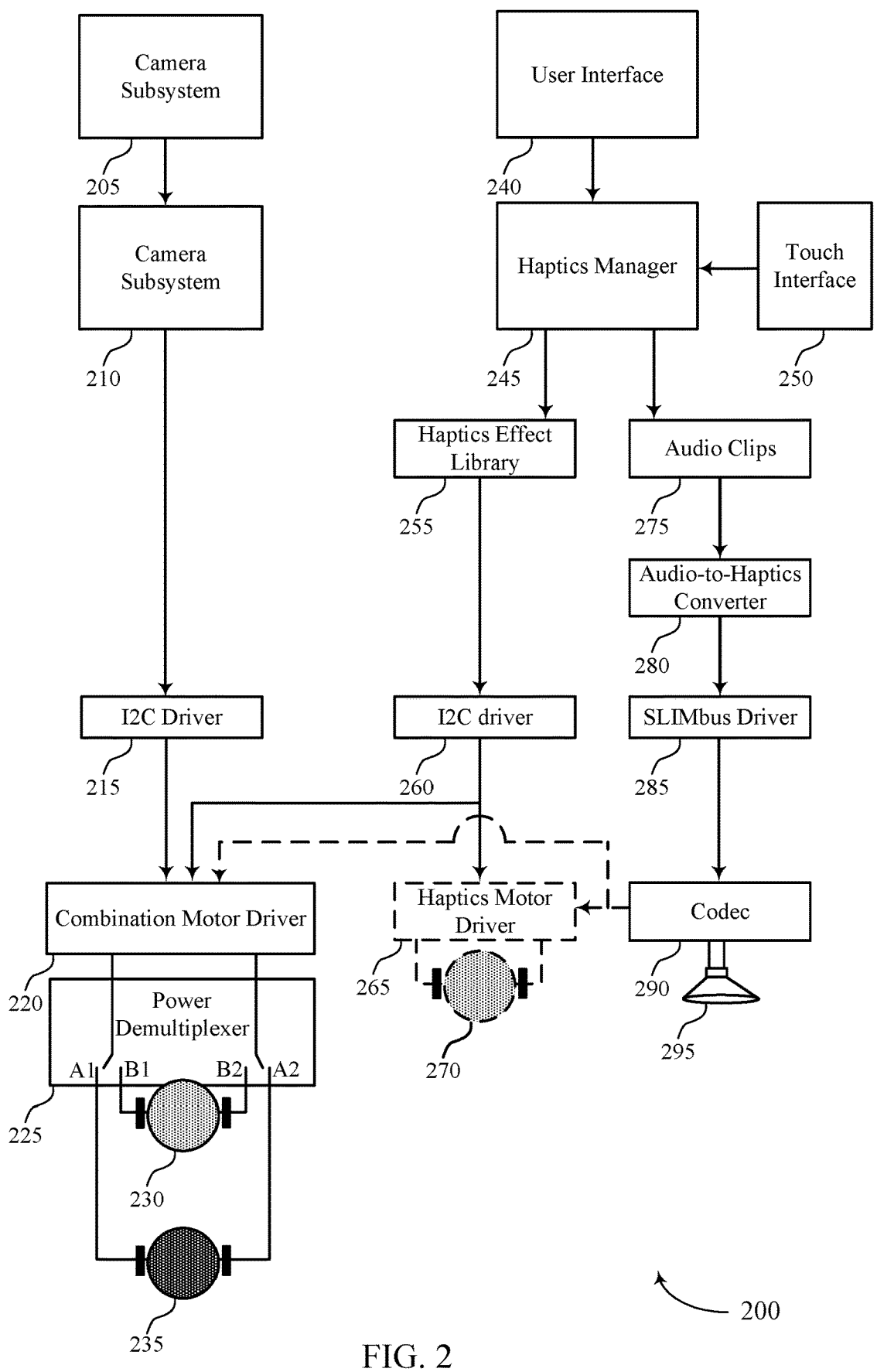
FIG. 2 illustrates an example of a device that supports an H-bridge driver for haptics and camera voice coil motor applications in accordance with aspects of the present disclosure.

FIG. 2 illustrates an example of a device 200 that supports an H-bridge driver for haptics and camera voice coil motor applications in accordance with examples of the present disclosure. In some examples, the device 200 may be an example of a device 105 or may implement examples of techniques performed by a device 105 as described with reference to FIG. 1.

The device 200 may be any suitable device incorporating a haptic motor and capable of capturing images or video including, for example, wired and wireless communication devices (such as camera phones, smartphones, tablets, security systems, dash cameras, laptop computers, desktop computers, automobiles, drones, aircraft, and so on), digital cameras (including still cameras, video cameras, and so on), or any other suitable device. The device 200 may include a camera subsystem 205, a camera subsystem 210, an Inter-IC (I2C) driver 215, a combination motor driver 220 (also referred to as a voice coil motor driver or a voice coil motor/haptics driver), a power demultiplexer 225, a haptics motor 230, a voice coil motor 235, a user interface 240, a haptics manager 245, a touch interface 250, a haptics effect library 255, an I2C driver 260, audio clips 275, an audio-to-haptics converter 280, a serial low-power inter-chip media bus (SLIMbus) driver 285, a codec 290, and a speaker 295. In some examples, the device 200 may include a haptics motor driver 265 and an additional haptics motor 270.

In some examples, the camera subsystem 205 may be configured for enabling raw data processing and controlling haptics. The camera subsystem 210 may be configured for enabling camera features and managing the voice coil motor 235 (e.g., in association with the imaging sensor of the device 200). In some cases, the camera subsystem 210 may include an electrically erasable programmable read-only memory (EEPROM).

The I2C driver 215 and I2C driver 260 may each include bidirectional open collector or open drain lines (e.g., Serial Data Line (SDA) and Serial Clock Line (SCL)), pulled up with resistors. In some examples, each of the I2C driver 215 and I2C driver 260 may be referred to as a two-wire interface (TWI). In some examples, the I2C driver 215 and I2C driver 260 may electrically couple low-speed components of the device 200 (e.g., microcontrollers, EEPROMs, A/D and D/A converters, I/O interfaces and other peripherals). For example, the I2C driver 215 may electrically couple components of the camera subsystem 210 and the combination motor driver 220. In some examples, the I2C driver 260 may electrically couple components of the haptics manager 245 and the haptics effect library 255 to the haptics motor driver 265.

The combination motor driver 220, haptics motor 230, and voice coil motor 235 may implement examples of the combination motor driver 160, haptics motor 165, and voice coil motor 155 respectively described with reference to FIG. 1. In some cases, the device 200 may include an imaging sensor (not shown). The imaging sensor may implement examples of the imaging sensor 150 described with reference to FIG. 1. The imaging sensor may include the voice coil motor 235. The haptics motor driver 265 and haptics motor 270 may implement examples of the haptics motor driver 170 and haptics motor 165 respectively described with reference to FIG. 1.

The power demultiplexer 225 may be an analog demultiplexer. In some examples, the combination motor driver 220 may control the power demultiplexer 225 to select between (e.g., to select between driving) the haptics motor 230 and the voice coil motor 235. For example, the combination motor driver 220 may output a digital signal to the power demultiplexer 225 to select between the haptics motor 230 and the voice coil motor 235. In some examples, using the combination motor driver 220, the device 200 may provide concurrent operational use of haptics and camera control of the device 200.

The user interface 240 may be a graphical user interface displayed on a display screen or touchscreen (e.g., a touch-sensitive display, for example, the touch interface 250) of the device 200. In some examples, the device 200 (e.g., based on a user input via the user interface 240) may enable haptics and haptics audio features of the device 200. In an example, the device 200 (e.g., based on a user input via the user interface 240) may control vibration strength, select haptics patterns, or implement haptics patterns for haptics responses associated with applications on the device 200.

The haptics manager 245 may select haptics and haptics audio features of the device 200. In an example, the haptics manager 245 may select haptics paths associated with applications on the device 200 (e.g., select between PMIC for haptics or codecs for haptics). In some examples, the haptics manager 245 may select haptics effects for haptics responses associated with applications on the device 200.

The touch interface 250 may be a touchscreen or touch-sensitive display of the device 200. The touch interface 250 may be configured to display images associated with an application on the device 200. The application may be, for example, a camera application, a gaming application, or any application receiving user inputs or providing feedback (e.g., a user notification, a haptic response) to a user of the device 200. In some examples, the touch interface 250 may provide information associated with the user inputs or provided feedback (e.g., signals indicating the user inputs or provided feedback) to the haptics manager 245. In some examples, the touch interface 250 may be any suitable display or screen allowing for user interaction and/or to present items (such as captured images and video, images or video from a gaming application) for viewing by a user. The touch interface 250 may be a display including a liquid-crystal display (LCD), a light emitting diode (LED) display, an organic LED (OLED), an active-matrix OLED (AMO-LED), or the like. In an example, the touch interface 250 may display images captured via the imaging sensor of the device 200.

The haptics effect library 255 may include tactile content such as haptic content (e.g., haptic effects). In some examples, the haptic content may include haptic effect definitions for applications (e.g., a camera application, a gaming application, or any application receiving user inputs or providing feedback) on the device 200. In an example, each haptics effect included in the haptics effect library 255 may include a pattern of voltages (e.g., varied voltages) which the device 200 may apply to an actuator (e.g., haptics motor 230) of the device 200.

The audio clips 275 may include audio files each including an audio effect definition. The audio clips 275 may be stored on a memory of the device 200 or a server coupled to the device 200. The audio files may be for applications (e.g., a camera application, a gaming application, or any application receiving user inputs or providing feedback) on the device 200. The audio-to-haptics converter 280 may convert the audio clips 275 to haptics effects. For example, the audio-to-haptics converter 280 may convert an audio effect definition into a haptic effect definition (e.g., using a conversion algorithm).

The SLIMbus driver 285 may support multi-channel audio paths and host control register access of the device 200. In some examples, the SLIMbus driver 285 may provide an interface between baseband or application processors and peripheral components of the device 200. For example, the SLIMbus driver 285 may provide an interface to the codec 290 or the speaker 295 of the device 200. The codec 290 may include a device or program which may encode or decode a digital data stream or digital signal.

In some cases, the codec 290 may convert digital signals to analog signals (e.g., using an audio decoder) for playback via the speaker 295. The codec 290 may transmit any of the digital data stream, digital signals, or analog signals to the combination motor driver 220 or the haptics motor driver 265. The combination motor driver 220 may drive the haptics motor 230 or the voice coil motor 235 based on the signals from the codec 290. The haptics motor driver 265 may drive the haptics motor 270 based on the signals from the codec 290.

The device 200 (e.g., the camera subsystem 205, the camera subsystem 210, and the haptics manager 245) may process multimedia data to support techniques for using an H-bridge driver for haptics and camera voice coil motor applications, according to the techniques described herein. The device 200 may include additional features or components not shown. For example, in some cases, a wireless interface, which may include a number of transceivers and a baseband processor, may be included for a wireless communication device. In some examples, the device 200 may include additional voice coil motor drivers, voice coil motors, haptics motor drivers, and haptics motors other than the combination motor driver 220, voice coil motor 235, haptics motor driver 265, haptics motor 230, and haptics motor 270. The disclosure should not be limited to any specific examples or illustrations, including example device 200.

According to examples described herein, the device 200 may generate a control signal for an application executing on the device 200 such as a camera application, a gaming application, or any application receiving a user input or outputting feedback (e.g., a user notification, a haptic response) to the user. The device 200 may generate the control signal using a combination motor driver 220 of a camera component (e.g., an imaging sensor, a lens, a lens barrel) of the device 200. In some examples, the device 200 (e.g., using the combination motor driver 220) may drive a haptics motor 230 of the device 200 based on the generated control signal and generate a haptic response based on driving the haptics motor 230. The device 200 may output the generated haptic response. In some other examples, the device 200 (e.g., using the combination motor driver 220) may drive a voice coil motor 235 of the device 200 based on the generated control signal. For example, the device 200 may control the camera component of the device 200 based on driving the voice coil motor 155.

In some examples, the device 200 may select between the haptics motor 230 or the voice coil motor 235 using an analog demultiplexer (e.g., power demultiplexer 225) based on the control signal. The device 200 may drive the haptics motor 230, or the voice coil motor 235, or both, based on the selecting. In some other examples, the device 200 may drive a second haptics motor (e.g., an additional haptics motor 230) of the device 200 based on the generated control signal. In an example, the device 200 may generate the haptic response based on driving the second haptics motor of the device 200. In some examples, the device 200 may generate a second control signal using a second voice coil motor driver (e.g., an additional combination motor driver 220) of the device 200. The device 200 may drive the haptics motor 230, the voice coil motor 235, a second haptics motor (e.g., an additional haptics motor 230), or a second voice coil motor (e.g., an additional voice coil motor 235), or any combination thereof, based on the generated second control signal.

Figure 3:
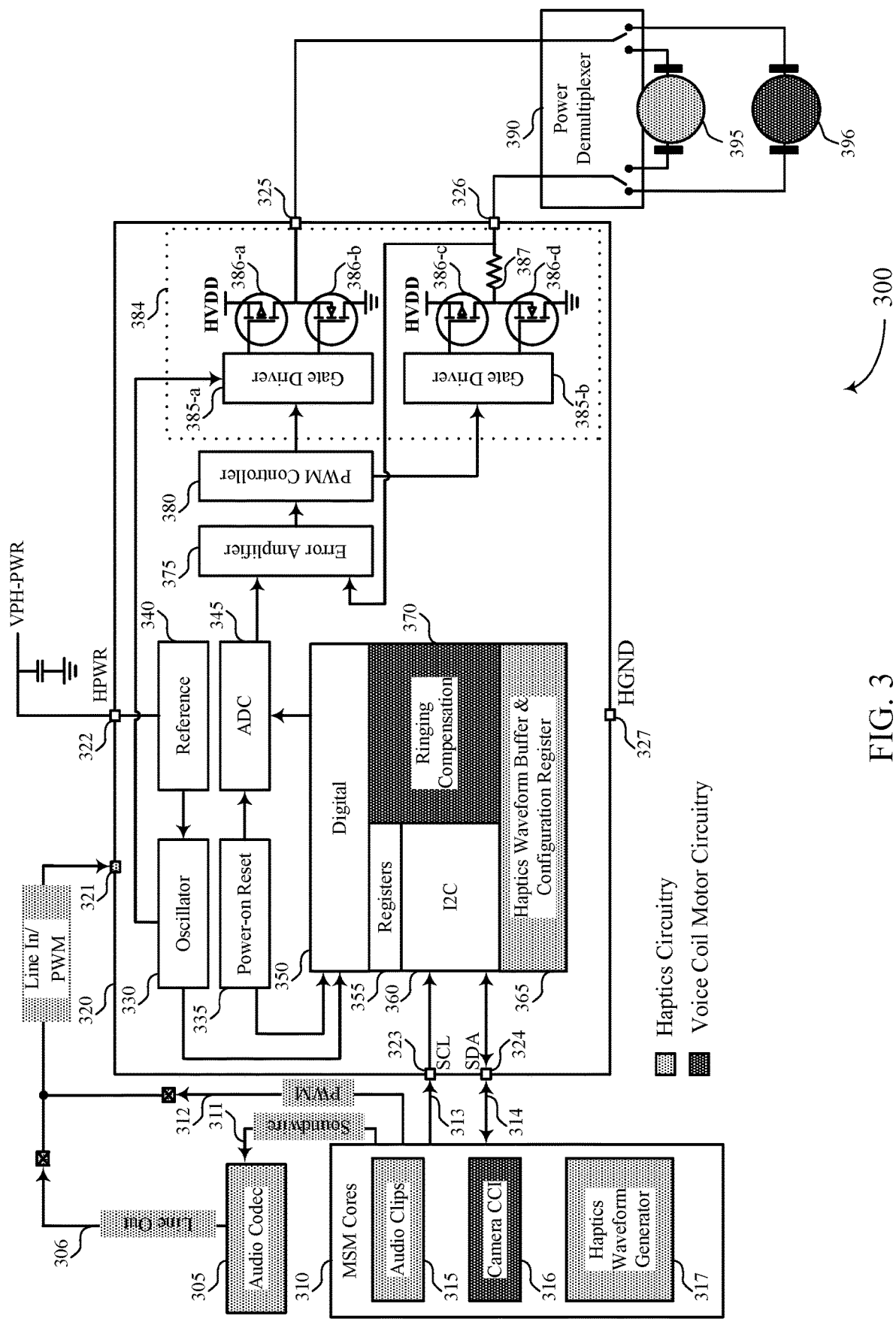
FIG. 3 shows a block diagram of a device that supports an H-bridge driver for haptics and camera voice coil motor applications in accordance with aspects of the present disclosure.

FIG. 3 shows a block diagram of a device 300 that supports an H-bridge driver for haptics and camera voice coil motor applications in accordance with aspects of the present disclosure. The device 300 may be an example of aspects of a device as described herein. For example, the device 300 may include an audio codec 305, one or more mobile station modem (MSM) cores 310, a motor management component 320, a power demultiplexer 390, a haptics motor 395, and a voice coil motor 396. Each of these components may be in communication with one another (e.g., via one or more buses, wires).

The audio codec 305 may include examples of examples of codec 290 described with reference to FIG. 2. The audio codec 305 may be electrically coupled to the MSM cores 310 via a two-wire communication bus (e.g., a SOUND-WIRE communication bus 311). In some examples, the audio codec 305 may be electrically coupled to the MSM cores 310 via a SLIMbus protocol (e.g., a two-wire communication bus associated with the SLIMbus driver 285 described with reference to FIG. 2). In some examples, a line out connection 306 (e.g., terminal, wire) of the audio codec 305 may be electrically coupled to a line in connection 321 (e.g., terminal, wire) of the motor management component 320 (e.g., to a pulse-width modulation controller 380 of the motor management component 320).

The MSM cores 310 may be, for example, system on chips (SoC). The MSM cores 310 may include an audio clips core 315, a camera control interface (CCI) 316, and a haptics waveform generator core 317. Each of these components may be in communication with one another (e.g., via one or more buses, wires). In some examples, the audio clips core 315 may include a chipset for digital audio recordings (e.g., audio clips). The audio clips core 315 may implement examples of audio clips 275 described with reference to FIG. 2. In some examples, the camera CCI core 316 may include protocols for communicating control data between a baseband processor of the device 300 and an image sensor (and/or one or more slave devices) of the device 300.

In some examples, the haptics waveform generator core 317 may generate haptics effects or haptics waveforms based on applications (e.g., a camera application, a gaming application, or any application receiving user inputs or providing feedback) on the device 300. For example, the haptics waveform generator core 317 may convert audio clips stored in the audio clips core 315 to haptics effects. The haptics waveform generator core 317 may implement examples of the audio-to-haptics converter 280.

In some examples, a pulse-width modulation connection 312 (e.g., terminal, wire) of the MSM cores 310 may be electrically coupled to the line in connection 321 (e.g., terminal, wire) of the motor management component 320 (e.g., to a pulse-width modulator or a pulse-width modulation controller 380 of the motor management component 320). In some example examples, the MSM cores 310 may output a signal 313 to a SCL 323 of the motor management component 320. In some examples, the MSM cores 310 may output a signal 314 to an SDA 324 of the motor management component 320. In an example, the device 300 may use SCL 323 and SDA 324 to control the transfer of data in and out of the device 300.

The motor management component 320 may include a power terminal 322 (e.g., HPWR) connected to a power supply VPH-PWR and a ground terminal 327 (e.g., HGND) connected to ground. In an example, the motor management component 320 may include terminals 325 and 326 connected to power demultiplexer 390. The motor management component 320 may include an oscillator 330, a power-on reset component 335, a reference component 340, and an analog-to-digital converter 345. In some examples, the motor management component 320 may include a digital component 350, registers 355, an I2C component 360, a ringing compensation component 370, and a haptics waveform buffer and configuration register 365. Each of these components may be in communication with one another (e.g., via one or more buses, wires).

In some examples, the motor management component 320 may include an error amplifier 375, a pulse-width modulation controller 380, and a combination motor driver 384 (also referred to as a voice coil motor driver or a voice coil motor/haptics driver). The combination motor driver 384 may include one or more gate drivers 385, one or more transistors 386, and a resistor 387 (e.g., a resistive load). In some examples, the transistors 386 may be metal-oxide-semiconductor field-effect transistor (MOSFET) devices. The combination motor driver 384 may implement examples of the combination motor driver 160 described with reference to FIG. 1 and the combination motor driver 220 described with reference to FIG. 2.

The oscillator 330 may generate and output a waveform signal to the digital component 350 and one or more of the gate drivers 385 (e.g., the gate driver 385-a). In an example, the oscillator 330 may generate and output a sine, square, triangle, or sawtooth waveform. In some examples, the oscillator 330 may generate and output a pulse-width modulated signal. The power-on reset component 335 may generate and output a power-on reset signal to reset components of the device 300. In an example, the power-on reset component 335 may set the power-on reset signal to a voltage level based on whether a voltage (e.g., VPH-PWR) supplied to the motor management component 320 is above a power-on reset threshold voltage (e.g., based on whether the supplied voltage is on or off). In some examples, the power-on reset component 335 may generate and output the power-on reset signal to the digital component 350 and analog-to-digital converter 345 based on the supplied voltage.

The reference component 340 may generate and output a reference voltage based on the voltage (e.g., VPH-PWR) supplied to the motor management component 320. The analog-to-digital converter 345 may be a 10-bit analog-to-digital converter. In some examples, the analog-to-digital converter 345 may convert analog signals to digital signals within the motor management component 320. The digital component 350 may output a control signal for haptics or a camera application on the device 300. In some examples, the digital component 350 may include a comparator. In some examples, the device 300 may control the power demultiplexer 390 based on the control signal to select a haptic motor path or voice coil motor path (e.g., to select the haptics motor 395 or the voice coil motor 396).

The registers 355 may store data received by a serial interface of the device 300 (e.g., data received via the SDA 324). In some examples, the data may be written to registers 355 based on register addresses according to a register table.

The I2C component 360 may include examples of the I2C drivers 215 and 260 described herein. In some examples, the I2C component 360 may receive and use an SDA signal and a serial clock (SCLK) signal to support serial transmission of 8-bit bytes of data along with device address bits and control bits over a two-wire serial bus. The haptics waveform buffer and configuration register 365 may store generated haptics waveforms and haptics configurations (e.g., as generated by the haptics waveform generator core 317).

The ringing compensation component 370 may shift a lens of the device 300 (e.g., of an imaging sensor of the device 300) to compensate for camera motion of the image sensor. In some examples, the ringing compensation component 370 may shift the lens such that the plane in which the lens lies is shifted. The error amplifier 375 may amplify a difference between a voltage output by the analog-to-digital converter 345 and the voltage at terminal 326. The error amplifier 375 may output the generated voltage to the pulse-width modulation controller 380.

The pulse-width modulation controller 380 may generate and output a control signal to combination motor driver 384 (e.g., to the gate drivers 385). In some examples, based on the control signal, the combination motor driver 384 (e.g., the gate drivers 385, the transistors 386, and resistor 387) may generate an output voltage for driving the haptics motor 395 or the voice coil motor 396. In some examples, the combination motor driver 384 may generate a programmable H-bridge driver pulse-width modulation frequency which may range from 500 kHz to 4000 kHz. For example, the pulse-width modulation controller 380 may output a pulse-width modulation signal (e.g., ranging from 500 kHz to 4000 kHz) to the combination motor driver 384 (e.g., to the gate drivers 385).

In some examples, the combination motor driver 384 may supply an output voltage (e.g., a driving voltage) to the haptics motor 395 or the voice coil motor 396 (e.g., via the power demultiplexer 390) based on the control signal output from the pulse-width modulation controller 380 and the waveform signal (e.g., pulse-width modulated signal) output from the oscillator 330. The power demultiplexer 390 may be an analog demultiplexer. The power demultiplexer 390 may implement examples of the power demultiplexer 225 described with reference to FIG. 2. In some examples, the device 200 (e.g., using the pulse-width modulation controller 380, the gate drivers 385) may control the power demultiplexer 390 to select between (e.g., to select between driving) the haptics motor 395 and the voice coil motor 396. For example, the device 300 may output a digital signal to the power demultiplexer 390 to select between the haptics motor 395 and the voice coil motor 396.

The combination motor driver 384 may include an H-bridge configuration. In some examples, the combination motor driver 384 may include a dynamic H-bridge driver pulse-width modulation frequency (e.g., a programmable H-bridge driver pulse-width modulation frequency), which may range from 500 kHz to 4000 kHz. The device 300 may be configured to select a full-bridge configuration, which may include all the transistors 386 and the resistor 387. Alternatively, the device 300 may be configured to select a half-bridge configurations from a set of half-bridge configurations. The device 300 may, in some examples, enable (or activate) a gate driver 385 or multiple gate drivers 385 (e.g., gate drivers 385-a and 385-b) to select the a full-bridge configuration or at least one of the half-bridge configuration of the set of half-bridge configurations.

The device 300 may select a first half-bridge configuration of the set of half-bridge configurations, which may have a circuit path including a transistor 386-*a*, a transistor 386-*d*, and the resistor 387. As such, the device 300 may introduce a control signal that may propagate through the circuit path including the transistor 386-*a*, the transistor 386-*d*, and the resistor 387 to drive the haptics motor 395 (or the voice coil motor 396), for example. In some other examples, the device 300 may select a second half-bridge configuration of the set of half-bridge configurations, which may have a circuit path including a transistor 386-*b*, a transistor 386-*c*, and the resistor 387. The device 300 may thereby introduce a control signal that may propagate through the circuit path including the transistor 386-*a*, the transistor 386-*d*, and the resistor 387, for example, to drive the haptics motor 395 (or the voice coil motor 396).

The device 300 may drive the haptics motor 395 (or the voice coil motor 396) using the combination motor driver 384 based on at least one of the half-bridge configuration of the set of half-bridge configurations. In some examples, the device 300 may drive the voice coil motor 396 using a half-bridge configuration and a feedback operation, which may provide precision current flow for moving a camera lens or lens barrel associated with the device 300 in a forward direction (e.g., zoom-in) or a backward direction (e.g., zoom-out). The device 300 may, for example, drive the voice coil motor 396 in the forward direction (e.g., zoom-in) using the first half-bridge configuration including the transistor 386-*a*, the transistor 386-*d*, and the resistor 387. Alternatively, the device 300 may drive the voice coil motor 396 in the backward direction (e.g., zoom-out) using the second half-bridge configuration including the transistor 386-*b*, the transistor 386-*c*, and the resistor 387. In other examples, the device 300 may use the first half-bridge configuration to drive the voice coil motor 396 in the backward direction (e.g., zoom-out) and the device 300 may use the second half-bridge configuration to drive the voice coil motor 396 in the forward direction (e.g., zoom-in).

The device 300 may drive the haptics motor 395 using the combination motor driver 384 based on the full-bridge configuration. In some examples, the device 300 may use the full-bridge configuration to provide for haptics motor movement in a clockwise direction or a counter-clockwise direction (e.g., for braking mechanism) in association with haptics applications. For example, the device 300 may drive the haptics motor 395 in the clockwise direction using the first half-bridge configuration including the transistor 386-*a*, the transistor 386-*d*, and the resistor 387. The device 300 may drive the haptics motor 395 in the counter-clockwise direction (e.g., for braking mechanism) using the second half-bridge configuration including the transistor 386-*b*, the transistor 386-*c*, and the resistor 387. In other examples, the device 300 may use the first half-bridge configuration to drive the haptics motor 395 in the counter-clockwise direction and the device 300 may use the second half-bridge configuration to drive the haptics motor 395 in the clockwise direction. By using the full-bridge configuration (e.g., the set of half-bridge configurations), the device 300 may provide for haptics motor movement in association with haptics applications.

In some cases, the device 300 may include an imaging sensor. The imaging sensor may implement examples of the imaging sensor 150 described with reference to FIG. 1. In an example, the imaging sensor may include any or all of the combination motor driver 384, the camera CCI core 316, the ringing compensation component 370, and the voice coil motor 396. In some examples, the device 300 may provide concurrent operational use of haptics and camera control of the device 300. The haptics motor 395 may implement examples of the haptics motor 165 described with reference to FIG. 1 and the haptics motor 230 described with reference to FIG. 2. The voice coil motor 396 may implement examples of the voice coil motor 155 described with reference to FIG. 1 and the voice coil motor 235 described with reference to FIG. 2.

Figure 4:
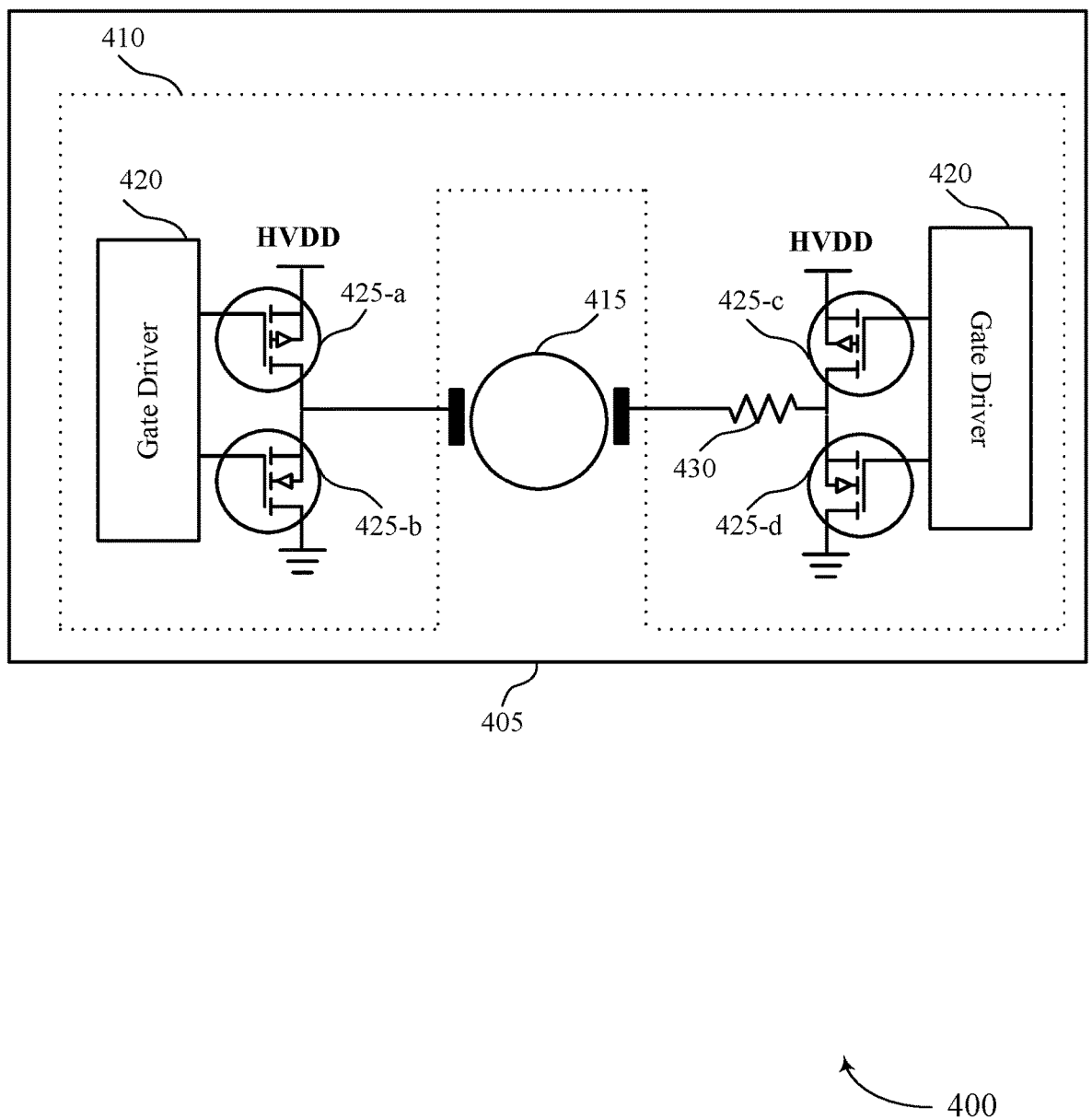
FIG. 4 illustrates an example of a device that supports an H-bridge driver for haptics and camera voice coil motor applications in accordance with aspects of the present disclosure.

FIG. 4 illustrates an example 400 of a device 405 that supports an H-bridge driver for haptics and camera voice coil motor applications in accordance with aspects of the present disclosure. The device 405 may be an example of aspects of a device 105, device 200, or device 300 as described herein. For example, the device 400 may include a combination motor driver 410 (also referred to as a voice coil motor driver or a voice coil motor/haptics driver) and a motor 415, which may be a voice coil motor or a haptics motor. The combination motor driver 410 and the motor 415 may be an example of aspects of a combination motor driver 160, a combination motor driver 220, or a combination motor driver 384 as described herein. Each of these components may be in communication with one another (e.g., via one or more buses, wires). The combination motor driver 410 may also include one or more gate drivers 420, one or more transistors 425, and a resistor 430. One or more of the gate drivers 420, the transistors 425, and the resistor 430 may be an example of aspects of one or more gate drivers 385, one or more transistors 386, and a resistor 387 as described herein. Each of these components may be in communication with one another (e.g., via one or more buses, wires).

The combination motor driver 410 may include an H-bridge configuration. In some examples, the combination motor driver 410 may include a dynamic H-bridge driver pulse-width modulation frequency (e.g., a programmable H-bridge driver pulse-width modulation frequency), which may range from 500 kHz to 4000 kHz. The device 405 may be configured to select a full-bridge configuration, which may include all the transistors 425 and the resistor 430. Alternatively, the device 405 may be configured to select a half-bridge configurations from a set of half-bridge configurations. The device 405 may, in some examples, enable (or activate) a gate driver 420 or both gate drivers 420 to select the a full-bridge configuration or at least one of the half-bridge configuration of the set of half-bridge configurations.

The device 405 may select a first half-bridge configuration of the set of half-bridge configurations, which may have a circuit path including a transistor 425-*a*, a transistor 425-*d*, and the resistor 430. As such, the device 405 may introduce a control signal that may propagate through the circuit path including the transistor 425-*a*, the transistor 425-*d*, and the resistor 430 to drive the motor 415, for example. In some other examples, the device 405 may select a second half-bridge configuration of the set of half-bridge configurations, which may have a circuit path including a transistor 425-*b*, a transistor 425-*c*, and the resistor 430. The device 405 may thereby introduce a control signal that may propagate through the circuit path including the transistor 425-*a*, the transistor 425-*d*, and the resistor 430, for example, to drive the motor 415.

The device 405 may drive the motor 415 using the combination motor driver 410 based on at least one of the half-bridge configuration of the set of half-bridge configurations. In some examples, if the motor 415 is a voice coil motor, the device 405 may drive the motor 415 using a half-bridge configuration and a feedback operation, which may provide precision current flow for moving a camera lens or lens barrel associated with the device 405 in a forward direction (e.g., zoom-in) or a backward direction (e.g., zoom-out). The device 405 may, for example, drive the motor 415 in the forward direction (e.g., zoom-in) using the first half-bridge configuration including the transistor 425-a, the transistor 425-d, and the resistor 430. Alternatively, the device 405 may drive the motor 415 in the backward direction (e.g., zoom-out) using the second half-bridge configuration including the transistor 425-b, the transistor 425-c, and the resistor 430. In other examples, the device 405 may use the first half-bridge configuration to drive the motor 415 in the backward direction (e.g., zoom-out) and the device 405 may use the second half-bridge configuration to drive the motor 415 in the forward direction (e.g., zoom-in).

The device 405 may drive the motor 415 using the combination motor driver 410 based on the full-bridge configuration. In some examples, if the motor 415 is a haptics motor, the device 405 may use the full-bridge configuration to provide for haptics motor movement in a clockwise direction or a counter-clockwise direction (e.g., for braking mechanism) in association with haptics applications. For example, the device 405 may drive the motor 415 in the clockwise direction using the first half-bridge configuration including the transistor 425-a, the transistor 425-d, and the resistor 430. The device 405 may drive the haptics motor in the counter-clockwise direction (e.g., for braking mechanism) using the second half-bridge configuration including the transistor 425-b, the transistor 425-c, and the resistor 430. In other examples, the device 405 may use the first half-bridge configuration to drive the motor 415 in the counter-clockwise direction and the device 405 may use the second half-bridge configuration to drive the motor 415 in the clockwise direction. By using the full-bridge configuration (e.g., the set of half-bridge configurations), the device 405 may provide for haptics motor movement in association with haptics applications.

Figure 5:
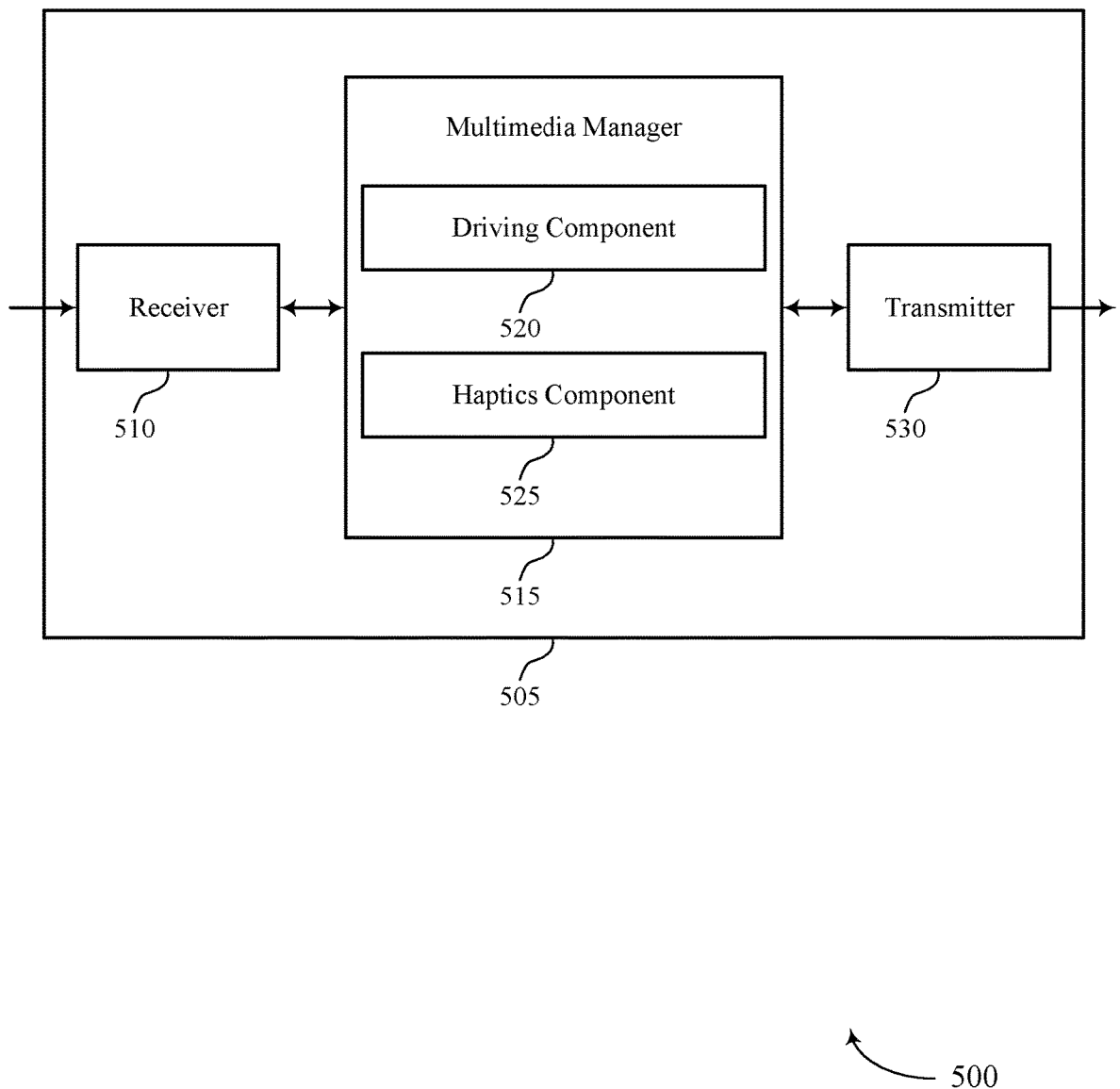
FIG. 5 shows a block diagram of a device that supports an H-bridge driver for haptics and camera voice coil motor applications in accordance with aspects of the present disclosure.

FIG. 5 shows a block diagram 500 of a device 505 that supports an H-bridge driver for haptics and camera voice coil motor applications in accordance with aspects of the present disclosure. The device 505 may be an example of aspects of a device 115 as described herein. The device 505 may include a receiver 510, a multimedia manager 515, and a transmitter 530. The device 505 may also include a processor. Each of these components may be in communication with one another (e.g., via one or more buses).

The receiver 510 may receive information such as packets, user data, or control information associated with various information channels (e.g., control channels, data channels, and information related to an H-bridge driver for haptics and camera voice coil motor applications, etc.). Information may be passed on to other components of the device 505. The receiver 510 may be an example of aspects of the transceiver 720 described with reference to FIG. 7. The receiver 510 may utilize a single antenna or a set of antennas.

The multimedia manager 515, or its sub-components, may be implemented in hardware, code (e.g., software or firmware) executed by a processor, or any combination thereof. If implemented in code executed by a processor, the functions of the multimedia manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The multimedia manager 515, or its sub-components, may be physically located at various positions, including being distributed such that portions of functions are implemented at different physical locations by one or more physical components. In some examples, the multimedia manager 515, or its sub-components, may be a separate and distinct component in accordance with various aspects of the present disclosure. In some examples, the multimedia manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The multimedia manager 515 may be an example of aspects of a multimedia manager as described herein. The multimedia manager 515 may include a driving component 520 and a haptics component 525. The multimedia manager 515 may be an example of aspects of the multimedia manager 710 as described herein. The driving component 520 may generate a control signal for an application executing on the device using a voice coil motor driver of the device. The driving component 520 may drive a haptics motor of the device based on the generated control signal. The haptics component 525 may generate a haptic response based on driving the haptics motor of the device. The haptics component 525 may output the generated haptic response from the device.

The transmitter 530 may transmit signals generated by other components of the device 505. In some examples, the transmitter 530 may be collocated with a receiver 510 in a transceiver module. For example, the transmitter 530 may be an example of aspects of the transceiver 720 described with reference to FIG. 7. The transmitter 530 may utilize a single antenna or a set of antennas.

Figure 6:
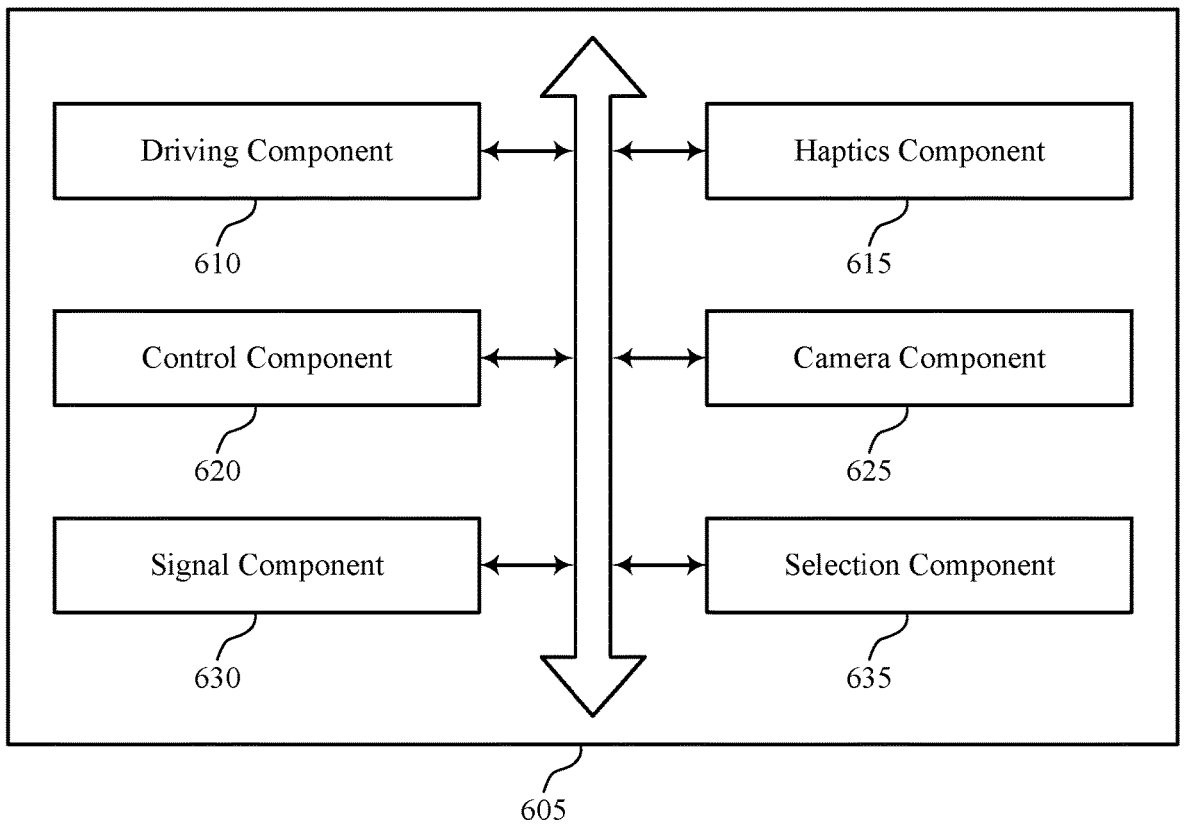
FIG. 6 shows a block diagram of a multimedia manager that supports an H-bridge driver for haptics and camera voice coil motor applications in accordance with aspects of the present disclosure.

FIG. 6 shows a block diagram 600 of a multimedia manager 605 that supports an H-bridge driver for haptics and camera voice coil motor applications in accordance with aspects of the present disclosure. The multimedia manager 605 may be an example of aspects of a multimedia manager 15, a multimedia manager 515, or a multimedia manager 710 described herein. The multimedia manager 605 may include a driving component 610, a haptics component 615, a control component 620, a camera component 625, a signal component 630, and a selection component 635. Each of these modules may communicate, directly or indirectly, with one another (e.g., via one or more buses).

The driving component 610 may generate a control signal for an application executing on the device using a voice coil motor driver (also referred to as a combination motor driver or a voice coil motor/haptics driver) of the device. In some examples, the driving component 610 may drive a haptics motor of the device based on the generated control signal. In some examples, the driving component 610 may drive a voice coil motor of the device based on the generated control signal. In some examples, the driving component 610 may enable at least one gate driver associated with the voice coil motor driver.

The driving component 610 may generate a second control signal using a second voice coil motor driver of the device. In some examples, the driving component 610 may drive a second haptics motor of the device based on the generated control signal. In some examples, the driving component 610 may drive the haptics motor, a voice coil motor of the device, a second haptics motor of the device, or a second voice coil motor of the device, or any combination thereof, based on the generated second control signal. The voice coil motor driver may include an H-bridge configuration.

The selection component 735 may select a full-bridge configuration or a half-bridge configuration of the H-bridge configuration may be based on enabling the at least one gate driver. In some examples, the driving component 610 may drive the haptics motor, or the voice coil motor, or both based on the full-bridge configuration or the half-bridge configuration of the H-bridge configuration. The haptics component 615 may generate a haptic response based on driving the haptics motor of the device. In some examples, the haptics component 615 may output the generated haptic response from the device. In some examples, the haptics component 615 may generate the haptic response based on driving the second haptics motor of the device.

The control component 620 may control a camera component of the device based on driving the voice coil motor or the haptics motor, or both. The camera component 625 may include the voice coil motor. The signal component 630 may generate a pulse-width modulation signal. In some examples, the signal component 630 may determine a duty cycle of the generated pulse-width modulation signal. The selection component 635 may select between the haptics motor or the voice coil motor using an analog demultiplexer based on the control signal, where driving the haptics motor, or the voice coil motor, or both, includes.

Figure 7:
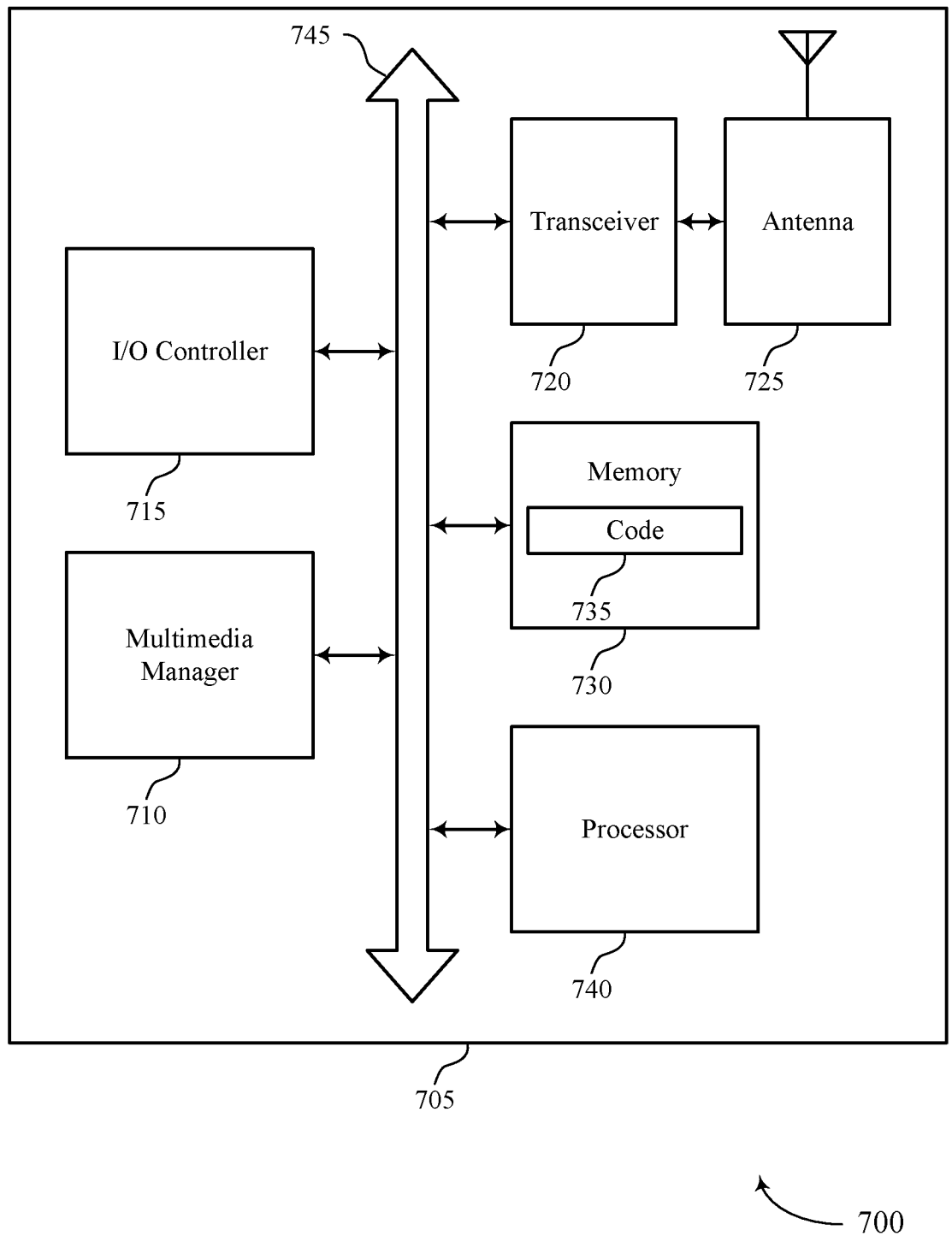
FIG. 7 shows a diagram of a system including a device that supports an H-bridge driver for haptics and camera voice coil motor applications in accordance with aspects of the present disclosure.

FIG. 7 shows a diagram of a system 700 including a device 705 that supports an H-bridge driver for haptics and camera voice coil motor applications in accordance with aspects of the present disclosure. The device 705 may be an example of or include the components of device 05, device 505, or a device as described herein. The device 705 may include components for bi-directional voice and data communications including components for transmitting and receiving communications, including a multimedia manager 710, an I/O controller 715, a transceiver 720, an antenna 725, memory 730, a processor 740, and a coding manager 750. These components may be in electronic communication via one or more buses (e.g., bus 745).

The multimedia manager 710 may generate a control signal for an application executing on the device using a voice coil motor driver (also referred to as a combination motor driver or a voice coil motor/haptics driver) of the device. In some aspects, the multimedia manager 710 may drive a haptics motor of the device based on the generated control signal. The multimedia manager 710 may generate a haptic response based on driving the haptics motor of the device and output the generated haptic response from the device.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the wireless device may include a single antenna 725. However, in some cases the device may have more than one antenna 725, which may be capable of concurrently transmitting or receiving multiple wireless transmissions.

The memory 730 may include random-access memory (RAM) and read-only memory (ROM). The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting an H-bridge driver for haptics and camera voice coil motor applications).

The code 735 may include instructions to implement aspects of the present disclosure, including instructions to support haptic feedback. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
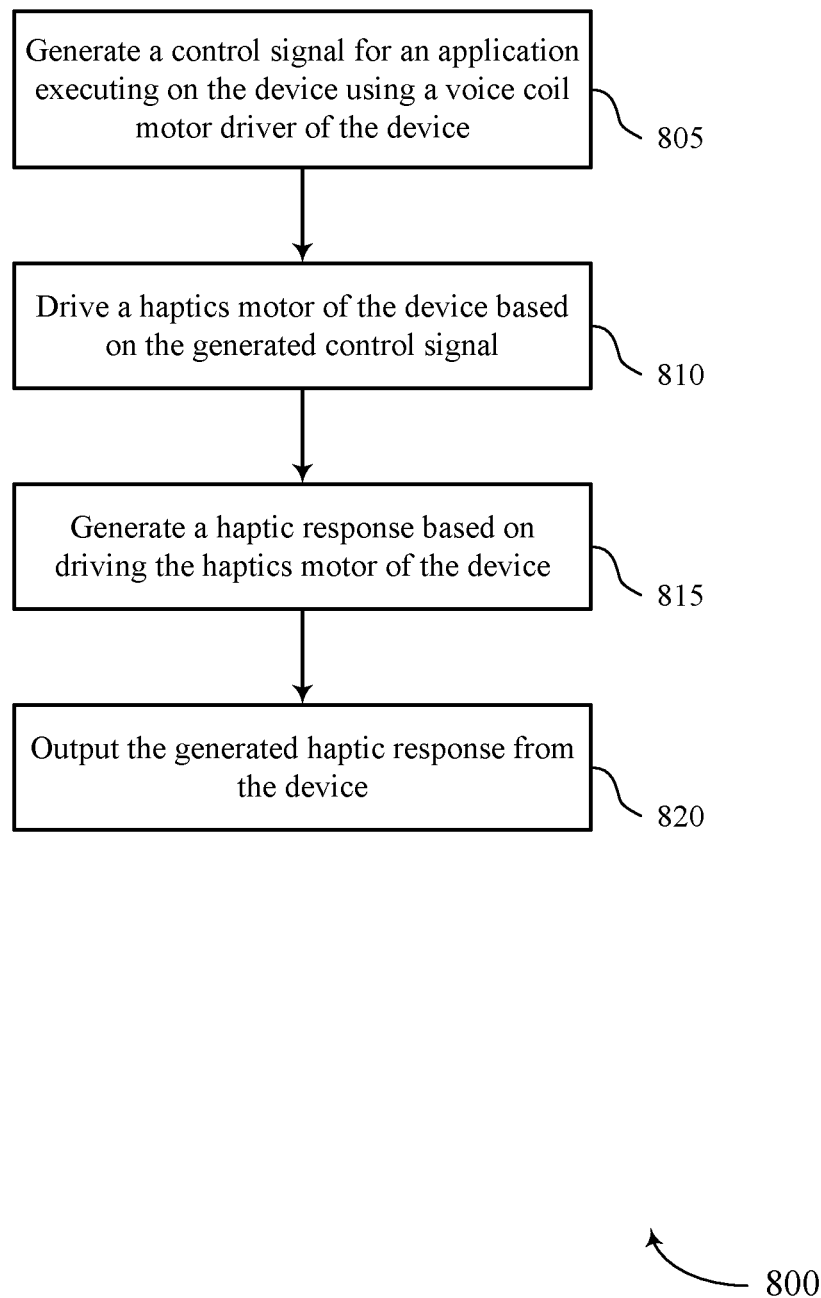
FIGS. 8 through 10 show flowcharts illustrating methods that support an H-bridge driver for haptics and camera voice coil motor applications in accordance with aspects of the present disclosure.

FIG. 8 shows a flowchart illustrating a method 800 that supports an H-bridge driver for haptics and camera voice coil motor applications in accordance with aspects of the present disclosure. The operations of method 800 may be implemented by a device or its components as described herein. For example, the operations of method 800 may be performed by a multimedia manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 805, the device may generate a control signal for an application executing on the device using a voice coil motor driver (also referred to as a combination motor driver or a voice coil motor/haptics driver) of the device. The operations of 805 may be performed according to the methods described herein. In some examples, aspects of the operations of 805 may be performed by a driving component as described with reference to FIGS. 5 through 7.

At 810, the device may drive a haptics motor of the device based on the generated control signal. The operations of 810 may be performed according to the methods described herein. In some examples, aspects of the operations of 810 may be performed by a driving component as described with reference to FIGS. 5 through 7.

At 815, the device may generate a haptic response based on driving the haptics motor of the device. The operations of 815 may be performed according to the methods described herein. In some examples, aspects of the operations of 815 may be performed by a haptics component as described with reference to FIGS. 5 through 7.

At 820, the device may output the generated haptic response from the device. The operations of 820 may be performed according to the methods described herein. In some examples, aspects of the operations of 820 may be performed by a haptics component as described with reference to FIGS. 5 through 7.

Figure 9:
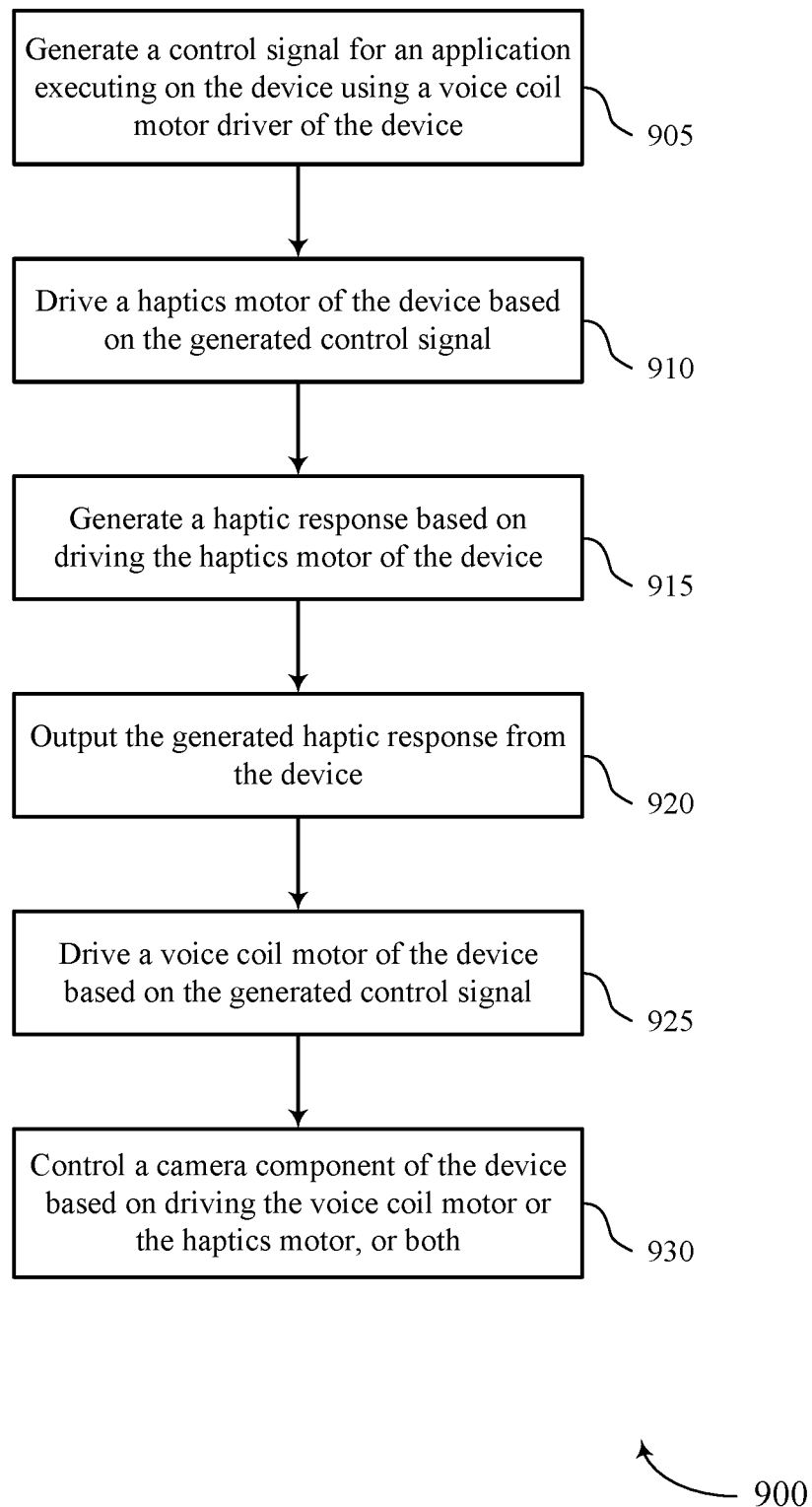

FIG. 9 shows a flowchart illustrating a method 900 that supports an H-bridge driver for haptics and camera voice coil motor applications in accordance with aspects of the present disclosure. The operations of method 900 may be implemented by a device or its components as described herein. For example, the operations of method 900 may be performed by a multimedia manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 905, the device may generate a control signal for an application executing on the device using a voice coil motor driver (also referred to as a combination motor driver or a voice coil motor/haptics driver) of the device. The operations of 905 may be performed according to the methods described herein. In some examples, aspects of the operations of 905 may be performed by a driving component as described with reference to FIGS. 5 through 7.

At 910, the device may drive a haptics motor of the device based on the generated control signal. The operations of 910 may be performed according to the methods described herein. In some examples, aspects of the operations of 910 may be performed by a driving component as described with reference to FIGS. 5 through 7.

At 915, the device may generate a haptic response based on driving the haptics motor of the device. The operations of 915 may be performed according to the methods described herein. In some examples, aspects of the operations of 915 may be performed by a haptics component as described with reference to FIGS. 5 through 7.

At 920, the device may output the generated haptic response from the device. The operations of 920 may be performed according to the methods described herein. In some examples, aspects of the operations of 920 may be performed by a haptics component as described with reference to FIGS. 5 through 7.

At 925, the device may drive a voice coil motor of the device based on the generated control signal. The operations of 925 may be performed according to the methods described herein. In some examples, aspects of the operations of 925 may be performed by a driving component as described with reference to FIGS. 5 through 7.

At 930, the device may control a camera component of the device based on driving the voice coil motor or the haptics motor, or both. The operations of 930 may be performed according to the methods described herein. In some examples, aspects of the operations of 930 may be performed by a control component as described with reference to FIGS. 5 through 7.

Figure 10:
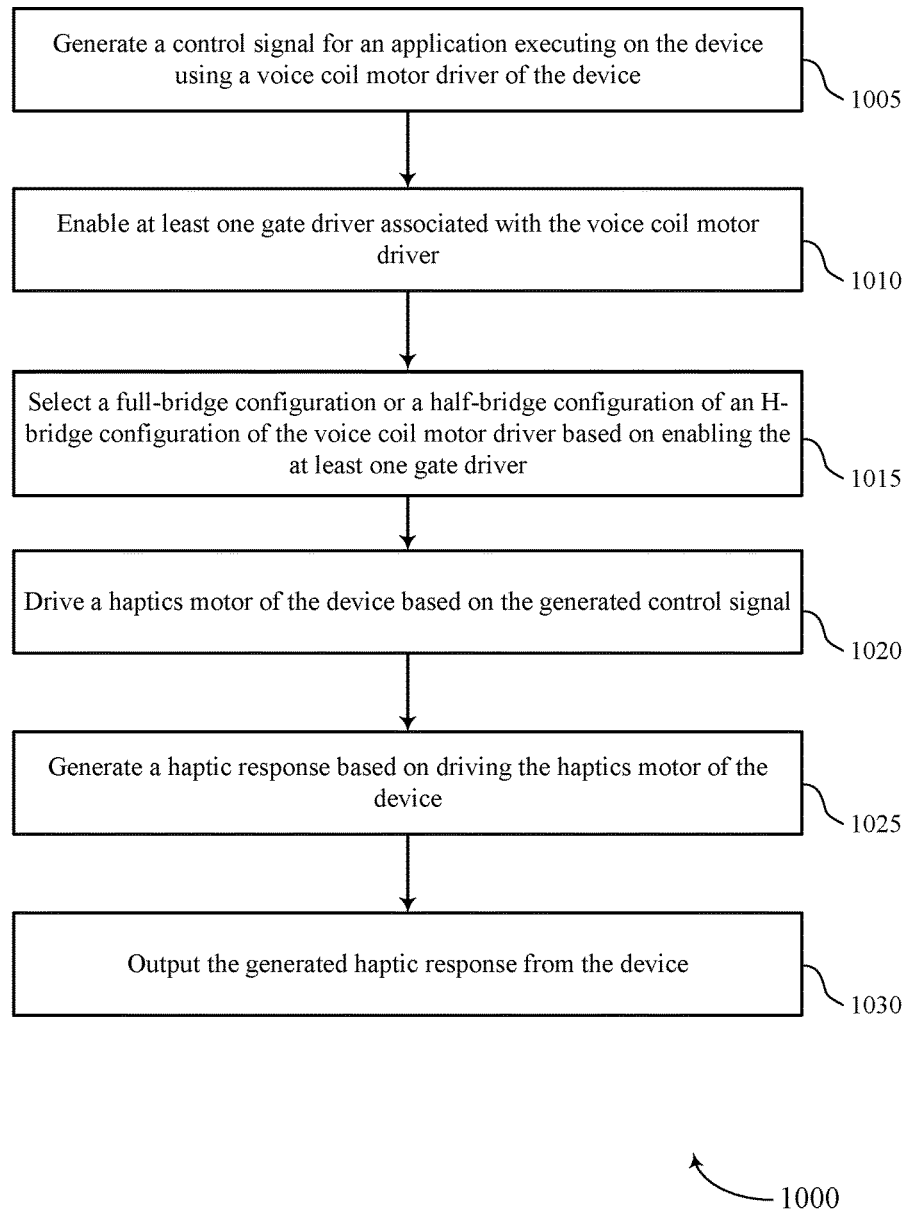

FIG. 10 shows a flowchart illustrating a method 1000 that supports an H-bridge driver for haptics and camera voice coil motor applications in accordance with aspects of the present disclosure. The operations of method 1000 may be implemented by a device or its components as described herein. For example, the operations of method 1000 may be performed by a multimedia manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 1005, the device may generate a control signal for an application executing on the device using a voice coil motor driver (also referred to as a combination motor driver or a voice coil motor/haptics driver) of the device. The operations of 1005 may be performed according to the methods described herein. In some examples, aspects of the operations of 1005 may be performed by a driving component as described with reference to FIGS. 5 through 7. In some aspects, the voice coil motor driver includes an H-bridge configuration.

At 1010, the device may enable at least one gate driver associated with the voice coil motor driver. The operations of 1010 may be performed according to the methods described herein. In some examples, aspects of the operations of 1010 may be performed by a driving component as described with reference to FIGS. 5 through 7.

At 1015, the device may select a full-bridge configuration or a half-bridge configuration of an H-bridge configuration of the voice coil motor driver based on enabling the at least one gate driver. The operations of 1015 may be performed according to the methods described herein. In some examples, aspects of the operations of 1015 may be performed by a haptics component as described with reference to FIGS. 5 through 7.

At 1020, the device may drive a haptics motor of the device based on the generated control signal. The operations of 1020 may be performed according to the methods described herein. In some examples, aspects of the operations of 1020 may be performed by a haptics component as described with reference to FIGS. 5 through 7.

At 1025, the device may the device may generate a haptic response based on driving the haptics motor of the device. The operations of 1025 may be performed according to the methods described herein. In some examples, aspects of the operations of 1025 may be performed by a driving component as described with reference to FIGS. 5 through 7.

At 1030, the device may output the generated haptic response from the device. The operations of 1030 may be performed according to the methods described herein. In some examples, aspects of the operations of 1030 may be performed by a driving component as described with reference to FIGS. 5 through 7.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for haptic feedback at a device, comprising:
generating a control signal for an application executing on the device using a voice coil motor driver of the device, the voice coil motor driver comprising an H-bridge configuration;
driving a haptics motor of the device based at least in part on the generated control signal;
generating a haptic response based at least in part on driving the haptics motor of the device; and
outputting the generated haptic response from the device.

2. The method of claim 1, further comprising:
driving a voice coil motor of the device based at least in part on the generated control signal; and
controlling a camera component of the device based at least in part on driving the voice coil motor or the haptics motor, or both.

3. The method of claim 2, wherein the camera component of the device comprises the voice coil motor.

4. The method of claim 2, wherein generating the control signal comprises:
generating a pulse-width modulation signal;
determining a duty cycle of the generated pulse-width modulation signal, wherein driving the haptics motor, or the voice coil motor, or both, comprises:
driving the haptics motor, or the voice coil motor, or both, based at least in part on the determined duty cycle of the generated pulse-width modulation signal.

5. The method of claim 1, wherein a camera component of the device comprises the voice coil motor driver.

6. The method of claim 1, further comprising:
enabling at least one gate driver associated with the voice coil motor driver;

selecting a full-bridge configuration or a half-bridge configuration of the H-bridge configuration based at least in part on enabling the at least one gate driver, wherein driving the haptics motor, or a voice coil motor, or both, comprises:
  driving the haptics motor, or the voice coil motor, or both, based at least in part on the full-bridge configuration or the half-bridge configuration of the H-bridge configuration.

7. The method of claim 1, further comprising:
selecting between the haptics motor or a voice coil motor using an analog demultiplexer based at least in part on the generated control signal, wherein driving the haptics motor, or the voice coil motor, or both, comprises:
  driving the haptics motor, or the voice coil motor, or both, based at least in part on the selecting.

8. The method of claim 1, further comprising:
driving a second haptics motor of the device based at least in part on the generated control signal, wherein generating the haptic response comprises:
  generating the haptic response based at least in part on driving the second haptics motor of the device.

9. The method of claim 1, further comprising:
generating a second control signal using a second voice coil motor driver of the device; and
driving the haptics motor, a voice coil motor of the device, a second haptics motor of the device, or a second voice coil motor of the device, or any combination thereof, based at least in part on the generated second control signal.

10. The method of claim 9, wherein generating the haptic response comprises:
generating the haptic response based at least in part on driving the second haptics motor of the device.

11. An apparatus for haptic feedback, comprising:
a processor,
memory coupled with the processor; and
instructions stored in the memory and executable by the processor to cause the apparatus to:
  generate a control signal for an application executing on the apparatus using a voice coil motor driver of the apparatus, the voice coil motor driver comprising an H-bridge configuration;
  drive a haptics motor of the apparatus based at least in part on the generated control signal;
  generate a haptic response based at least in part on driving the haptics motor of the apparatus; and
  output the generated haptic response from the apparatus.

12. The apparatus of claim 11, wherein the instructions are further executable by the processor to cause the apparatus to:
drive a voice coil motor of the apparatus based at least in part on the generated control signal; and
control a camera component of the apparatus based at least in part on driving the voice coil motor or the haptics motor, or both.

13. The apparatus of claim 12, wherein the camera component of the apparatus comprises the voice coil motor.

14. The apparatus of claim 12, wherein the instructions to generate the control signal are executable by the processor to cause the apparatus to:
generate a pulse-width modulation signal; and
determine a duty cycle of the generated pulse-width modulation signal, wherein the instructions to drive the haptics motor, or the voice coil motor, or both, are executable by the processor to cause the apparatus to:
  drive the haptics motor, or the voice coil motor, or both, based at least in part on the determined duty cycle of the generated pulse-width modulation signal.

15. The apparatus of claim 11, wherein a camera component of the apparatus comprises the voice coil motor driver.

16. The apparatus of claim 11, wherein the instructions are further executable by the processor to cause the apparatus to:
enable at least one gate driver associated with the voice coil motor driver; and
select a full-bridge configuration or a half-bridge configuration of the H-bridge configuration based at least in part on enabling the at least one gate driver, wherein the instructions to drive the haptics motor, or a voice coil motor, or both, are executable by the processor to cause the apparatus to:
  drive the haptics motor, or the voice coil motor, or both, based at least in part on the full-bridge configuration or the half-bridge configuration of the H-bridge configuration.

17. The apparatus of claim 11, wherein the instructions are further executable by the processor to cause the apparatus to:
select between the haptics motor or a voice coil motor using an analog demultiplexer based at least in part on the generated control signal, wherein the instructions to drive the haptics motor, or the voice coil motor, or both, are executable by the processor to cause the apparatus to:
  drive the haptics motor, or the voice coil motor, or both, based at least in part on the selecting.

18. An apparatus for haptic feedback, comprising:
means for generating a control signal for an application executing on the apparatus using a voice coil motor driver of the apparatus, the voice coil motor driver comprising an H-bridge configuration;
means for driving a haptics motor of the apparatus based at least in part on the generated control signal;
means for generating a haptic response based at least in part on driving the haptics motor of the apparatus; and
means for outputting the generated haptic response from the apparatus.

* * * * *